(12) United States Patent
Wang et al.

(10) Patent No.: US 12,349,068 B2
(45) Date of Patent: Jul. 1, 2025

(54) LOW POWER WI-FI BACKSCATTER COMMUNICATION

(71) Applicant: The Regents of the University of California, Oakland, CA (US)

(72) Inventors: Po-Han Wang, La Jolla, CA (US); Patrick Mercier, La Jolla, CA (US); Dinesh Bharadia, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 403 days.

(21) Appl. No.: 17/799,409

(22) PCT Filed: Feb. 12, 2021

(86) PCT No.: PCT/US2021/017855
§ 371 (c)(1),
(2) Date: Aug. 12, 2022

(87) PCT Pub. No.: WO2021/163480
PCT Pub. Date: Aug. 19, 2021

(65) Prior Publication Data
US 2023/0119392 A1 Apr. 20, 2023

Related U.S. Application Data

(60) Provisional application No. 62/976,834, filed on Feb. 14, 2020.

(51) Int. Cl.
*H04W 52/02* (2009.01)
(52) U.S. Cl.
CPC ............................. *H04W 52/0229* (2013.01)

(58) Field of Classification Search
CPC ............... H04B 5/72; H04B 5/77; H04B 5/79
See application file for complete search history.

(56) References Cited

U.S. PATENT DOCUMENTS

2009/0217144 A1* 8/2009 Turner .................. H03M 13/09
340/572.1
2017/0373892 A1* 12/2017 Ganesan ............. H04B 17/318
(Continued)

OTHER PUBLICATIONS

Kellogg, et al., "Wi-Fi Backscatter: Internet Connectivity for RF-Powered Devices", SIGCOMM, 2014, pp. 607-618.
(Continued)

*Primary Examiner* — Bo Hui A Zhu
(74) *Attorney, Agent, or Firm* — Greer, Burns & Crain, Ltd.; Steven P. Fallon

(57) ABSTRACT

A method for communicating directly with commodity Wi-Fi transceivers (TRXs) via backscatter modulation in an integrated tag device is provided. The method includes sensing an incident Wi-Fi? compliant wake-up signal. The method than reflects the incident Wi-Fi-complaint wake-up signal by encoding data from the tag device such that the reflected signal follows the Wi-Fi standard compliant and can be decoded by another WiFi-device. An integrated device includes a downlink Wi-Fi compatible wake-up receiver that checks timing of Wi-Fi compatible signals for a wake-up packet. The device has a modulator that is turned on in response to the wake-up packet and a mixer in the modulator hat mixes tag data with a payload packet from received Wi-Fi payload. Backscatter switches backscatter the response.

9 Claims, 11 Drawing Sheets

(56) References Cited

U.S. PATENT DOCUMENTS

2018/0212807 A1* 7/2018 Zhang .................. H04B 5/00
2021/0084251 A1* 3/2021 Gollakota ............. H04N 5/40

OTHER PUBLICATIONS

Kellogg, et al., "Passive Wi-Fi: Bringing Low Power to Wi-Fi Transmissions", 13th USENIX Symposium on Networked Systems Design and Implementation, 2016, pp. 151-164.

Shirane, et al., "A 5.8GHz RF-Powered Transceiver with a 113μW 32-QAM Transmitter Employing the IF-based Quadrature Backscattering Technique", ISSCC, Energy-Efficient RF Systems, 2015, Session 13, pp. 248-249.

Zhang, et al., "HitchHike: Practical Backscatter Using Commodity WiFi", SenSys, 2016, vol. 14-16.

Zhang, et al., "FreeRider: Backscatter Communication Using Commodity Radios", CoNEXT, 2017, pp. 389-401.

\* cited by examiner

LOW POWER WI-FI BACKSCATTER COMMUNICATION

PRIORITY CLAIM AND REFERENCE TO RELATED APPLICATION

The application claims priority under 35 U.S.C. § 119 and all applicable statutes and treaties from prior U.S. provisional application Ser. No. 62/976,834 which was filed Feb. 14, 2020.

STATEMENT OF GOVERNMENT INTEREST

This invention was made with government support grant number 1923902 awarded by National Science Foundation. The government has certain rights in the invention.

FIELD

A field of the invention includes wireless communications, communications with commodity Wi-Fi transceivers, and low-power wake-up of wireless receivers via Wi-Fi.

TABLE OF ACRONYMS

The following table defines acronyms/abbreviations used throughout the following description:
AP Access Point
ASK Amplitude Shift Keying
BLE Bluetooth Low Energy
BPSK Binary Phase Shift Keying
Bps Bits Per Second
CW Continuous Wave
CSI Channel State Information
CMOS Complementary Metal Oxide Semiconductor
DIFS Distributed Interframe Space
dBi Antenna Gain
dBm Decibel Milliwatts
ED Envelope Detector
GHz Gigahertz
IC Integrated Circuit
IF Intermediate Frequency
IoT Internet of Things
IRR Image Rejection Ratio
IQ In Phase and Quadrature
LNA Low-Noise Amplifier
LO Local Oscillator
LSB Lower Sideband
Mbps Megabits Per Second
MUX Multiplexer
NFC Near Field Communications
NMOS N Channel MOSFET
OOK On Off Keying
PA Power Amplifier
PLL Phase Locked Loop
PSK Phase Shift Keying
QPSK Quadrature Phase Shift Keying
RCC R Resistor Capacitor Capacitor Resistor
RF Radio Frequency
RFID Radio Frequency Identification
RSSI Received Signal Strength Indicator
RX Receiver
SSB Single Sideband
TRX Transceiver
TX Transmitter
USB Upper Sideband
VBS Body-to-Source Substrate Bias
VCO Voltage Controlled Oscillator
Wi-Fi Wireless Compatible with the Wi-Fi Alliance
WuRX Wake Up Receiver
XOR Exclusive OR function
XTAL Crystal

BACKGROUND

Wi-Fi is the only non-cellular pervasive wireless network infrastructure in place today. This is why most IoT devices must connect to the internet via Wi-Fi. A problem is that conventional Wi-Fi transceivers have power demands that conflict with the very low power ideal of IoT devices. Conventional Wi-Fi transceivers require 10 s to 100 s of mW of active power from RF blocks such as LNAs, LO frequency generation and stabilization, and power amplifiers (PAs), in part due to strict performance demands imposed by the IEEE 802.11-based standards. As a result, nearly all current Wi-Fi compatible IoT devices require either wall power, or large and/or frequently re-charged batteries.

While other standards with lower standards-based performance requirements, such as BLE, may achieve very low average power (<<1 mW) via duty-cycling at the expense of throughput and latency, very small coin cell batteries or energy harvesters still cannot be used due to relatively high peak power requirements (e.g., a few mW for BLE). More importantly, standards such as BLE do not have widely distributed infrastructure in most homes, offices, or other environments, which makes rapid low-cost deployment difficult.

To enable a new class of miniaturized, battery-powered or energy-harvested IoT devices, backscatter communication, where an incident RF source is reflected via a low-power impedance modulating tag, has been proposed [1]. However, most current solutions rely on custom tone generators [1,2], and thus cannot be rapidly deployed at scale with low cost. To enable operation with existing infrastructure, recent work has shown that already-pervasive Wi-Fi signals can be used as incident RF sources for backscattering, and through techniques such as codeword translation, commodity Wi-Fi RXs can be used to receive backscattered data [3,4]. However, the demonstrated technique required a Wi-Fi RF source (such as a smartphone) within 6 m of the tag, and two separate Wi-Fi readers within 8 m.

Perhaps the most popular technologies leveraging backscatter communications today are NFC and RFID tags. NFC tags are widely used in applications such as contactless payment systems and electronic keycards, use near-field inductive coupling between two coils to transmit data, which limits the operating range to within approximately 10 cm of the source. For this reason, NFC is not well suited for most IoT applications. However, because of its inductive coupling mechanism, NFC tags normally operate at 13.56 MHz and are resilient to RF interference. RFID tags, which can be widely seen in applications such as highway electronic toll system and inventory management system, use far-field radiative coupling for transmission. RFID tags normally operate at 0.4-2.4 GHz, and meters of communication range are achievable. RFID tags are suitable for IoT devices in terms of range and power. However, the conventional RFID tags have limitations that are less than ideal for IoT device applications.

One limitation concerns spectral efficiency. Conventional RFID tags receive a CW signal and reflect it with data modulation limited to ASK or OOK only. These techniques are not spectrally efficient.

Another limitation concerns interference resiliency. Because the downlink incident wave is a CW signal, and the uplink reflected wave is an ASK/OOK signal, RFID tags are very susceptible to RF interference. To solve this issue, normally the direction and location of the CW source (e.g., RFID readers) are optimized, for example, inside a warehouse using an RFID inventory management system. This is not practical for mass IoT devices coexistence at home or in urban areas.

An additional limitation concerns compatibility with existing standards and low-cost deployment. To generate a CW incident wave and be able to demodulate the reflected signal, a dedicated RFID reader hardware is required. However, this approach contradicts the target of cost-effective direct deployment that leverages well-established standards such as Wi-Fi.

Backscatter Wi-Fi has been proposed. However, none of the proposed techniques meets the need of using only commodity Wi-Fi hardware with a low-power backscattering integrated circuit, good sensitivity and high data rates.

One proposed Wi-Fi compatible solution is called Wi-Fi Backscatter [5]. A Wi-Fi access point (AP) transmits the signal to both the tag and the receiving Wi-Fi station, while the tag modulates the channel RSSI by absorbing and backscattering the signal alternately with the tag's data. This ASK-modulated signal (modulated in terms of RSSI) can be demodulated by the receiving Wi-Fi station via checking the CSI or RSSI, which are normally provided in state-of-the-art Wi-Fi chipsets. This is a good hardware approach, but the approach uses the entire Wi-Fi packet as a single bit, and therefore achieves very low data rate (100 s of bps). Moreover, the inherent lower sensitivity RSSI receiver from the standard chips along with ambient noise in the implemented system limited the range to only 0.65-2.1 m.

Another solution, called passive Wi-Fi, [2], was designed to improve upon the approach discussed in the previous paragraph. This passive Wi-Fi approach uses a conventional TX architecture to generate an IEEE 802.11b baseband signal directly. Instead of generating the power-hungry RF LO locally, a single tone RF source provides the RF LO outside, and the Wi-Fi compatible packet is synthesized by combining the baseband signal with the incident LO via backscatter modulation through the antenna. Although this method can enable a low power tag, only the uplink is Wi-Fi compatible, while the downlink still requires custom hardware to generate the CW signal.

A solution to this issue called Hitchhike is proposed in [3] and can achieve Wi-Fi compatibility in both the downlink and the uplink. A Wi-Fi signal generated by a mobile phone creates the incident signal received by the IoT tag. The tag performs PSK-based modulation on each symbol of the incident wave, which creates a backscatter signal on a different channel for reception by a Wi-Fi AP2. Meanwhile, the original un-disturbed Wi-Fi transmission from the mobile phone is received by AP1. Thus, AP1 has the original phone data, while AP2 has phone data that has been phase modulated by the IoT tag. By connecting the two APs through the cloud, both data are available to a decoder. This decoder employs a technique called codeword translation to decode the tag's data. Theoretically, there is only the need for one Wi-Fi transmitter and one receiver in this approach. However, the limited range of the downlink wake-up receiver required use of a third device (the mobile phone) to close a reasonable link budget.

REFERENCES

[1] A. Shirane et. al., "A 5.8 GHz RF-Powered Transceiver with a 113 µW 32-QAM Transmitter Employing the IF-based Quadrature Backscattering Technique" in Proc. ISSCC Technical Digest, 2015.

[2] JB. Kellogg et al., "Passive Wi-Fi: bringing low power to Wi-Fi transmissions," in Proc. of the Conference on Networked Systems Design and Implementation, pp. 151-164, 2016.

[3] P. Zhang et al., "HitchHike: Practical Backscatter Using Commodity Wi-Fi," In Proc. of the ACM Conference on Embedded Network Sensor Systems, pp. 259-271, 2016.

[4] P. Zhang et al., "FreeRider: Backscatter Communication Using Commodity Radios," In Proc. of the International Conference on Emerging Networking Experiments and Technologies (CoNEXT '17), pp. 389-401. 2017.

[5] B. Kellogg, A. Parks, S. Gollakota, J. R. Smith, and D. Wetherall, "Wi-Fi Backscatter: Internet connectivity for RF-powered devices," in Proc. ACM Conf. SIGCOMM, August 2014, pp. 607-618.

SUMMARY OF THE INVENTION

A preferred embodiment provides a method for communicating directly with commodity Wi-Fi transceivers (TRXs) via backscatter modulation in an integrated tag device is provided. The method includes sensing an incident Wi-Fi-compliant wake-up signal. The method than reflects the incident Wi-Fi-complaint wake-up signal by encoding data from the tag device such that the reflected signal follows the Wi-Fi standard compliant and can be decoded by another WiFi-device. In preferred methods, the reflecting includes modulating an incident Wi-Fi data packet header via frequency-translation to another Wi-Fi channel, while modulating an incident Wi-Fi data packet payload with tag device data. Preferably, the reflecting comprises operating an integrated IQ mixer driving multi-phase-terminated backscatter switches to generate a single-sideband QPSK modulation backscatter tag response to another Wi-Fi channel, while BPSK and other modulations can be used to sill provide a very low power Wi-Fi compatible backscatter communication method.

An integrated device includes a downlink Wi-Fi compatible wake-up receiver that checks timing of Wi-Fi compatible signals for a wake-up packet. The device has a modulator that is turned on in response to the wake-up packet and a mixer in the modulator hat mixes tag data with a payload packet from received Wi-Fi payload. Backscatter switches backscatter the response. The wake-up receiver can include a front-end matching network that provides passive gain to a received signal, a passive demodulator that demodulates the received signa, a filter for bandwidth filtering of the received signal, an analog to digital converter for converting the received signal, and a digital correlator with soft-decision decoding to check the received signal for pre-specified Wi-Fi wake up packet via a threshold comparison and once the threshold is exceeded generate a wake-up signal to enable the modulator.

DETAILED DESCRIPTION OF THE PREFERRED EMBODIMENTS

Figure 1A:
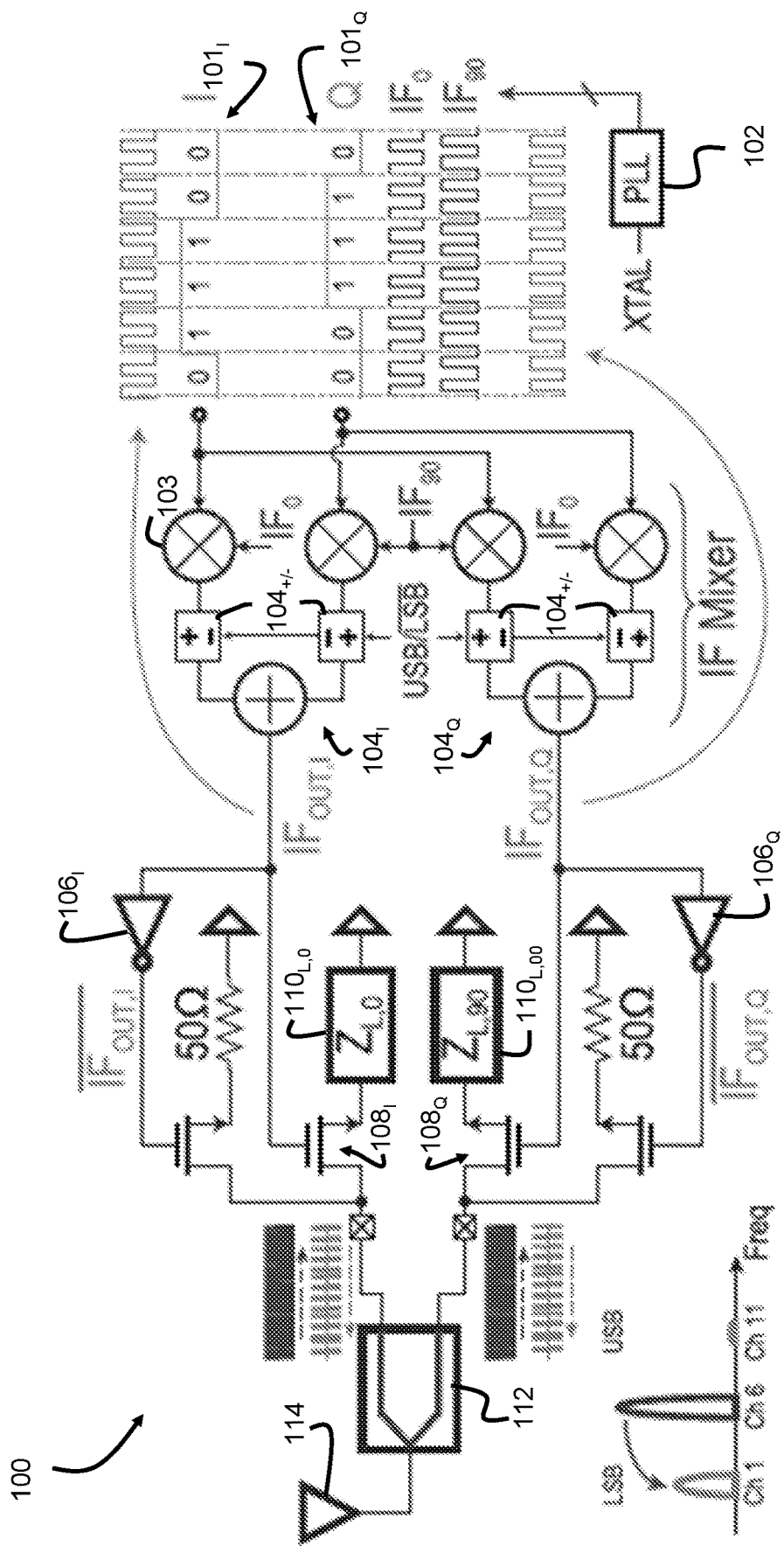
FIG. 1A is a block diagram a preferred transmission-line-less programmable SSB QPSK backscatter modulator.

This invention provides an IC demonstrating Wi-Fi-compatible backscatter-based communication and requires no external transmission line to function. There are many potential applications that can be enabled with a 28 µW Wi-Fi-compliant radio. In addition, preferred circuits enable single-side-band QPSK modulation at very low power, or alternatively BPSK or another arbitrary modulation.

The invention provides what is believed to be the first low-power IC designed for communicating directly with commodity Wi-Fi TRXs via backscatter modulation over substantial distances. Receivers can be woken up directly via a Wi-Fi TRX using a 2.8 µW wake-up receiver with −42.5 dBm sensitivity-good enough for >30 m wake-up range, and backscatters to a frequency-translated Wi-Fi channel via an on-chip 28 µW single-side-band QPSK modulator. Wireless tests reveal a range of 21 m between Wi-Fi access points.

Preferred methods and circuits provide pragmatic, low-power communication with commodity Wi-Fi hardware by 1) synchronizing to architected incident Wi-Fi-compliant packets via an integrated low power (e.g., 2.8 µW) energy-detecting WuRX; 2) modulating the phase of incident Wi-Fi signals and frequency-translating them to another Wi-Fi channel via a crystal-stabilized multi-phase LO, to enable clear and robust reception of protocol-compliant data; 3) utilizing an IQ mixer driving multi-phase-terminated backscatter switches to enable SSB QPSK modulation to a another Wi-Fi channel; and 4) receiving and decoding the tag data with a commercial Wi-Fi TRX by XOR-ing the original incident Wi-Fi data (via the cloud) and the received backscattered alteration.

A preferred experimental chip operated by receiving a series of packets generated from a Wi-Fi access point (AP), which feeds into a low-power energy-detecting wake-up receiver that determines when backscatter communication should commence. Then, the Wi-Fi AP sends an additional packet that is intended to be backscatter modulated. To accomplish this, the antenna receiving the incident Wi-Fi packet is terminated by a dynamically varying collection of complex impedances via a crystal-stabilized multi-phase local oscillator driven by a SSB mixer, which ultimately performs SSB QPSK modulation with frequency-translation to a separate Wi-Fi channel for reception by a second Wi-Fi AP. Implemented in 65-nm CMOS, the downlink wake-up receiver consumes 2.8 µW and achieves a sensitivity of −42.5 dBm, which is good enough for >30 m wake-up range, while the backscattering uplink consumes 28 µW and achieves 17 dB of image rejection. Wireless tests reveal a range of 21 m when the developed IC is placed symmetrically between Wi-Fi APs, and a range of >90 m when the developed IC is placed within 1 m of the transmitting Wi-Fi AP.

A preferred embodiment receiver can 1) wake up to carefully architected incident Wi-Fi compatible packets via an integrated 2.8 µW energy-detecting WuRX; 2) modulate the phase of incident Wi-Fi signals and frequency-translated them to another Wi-Fi channel via a crystal-stabilized multiphase LO to enable clear and robust reception of protocol-compliant data; 3) utilize an IQ mixer driving multi-phase-terminated backscatter switches to enable SSB QPSK modulation to a another Wi-Fi channel; and 4) receive and decode tag data with a commercial Wi-Fi TRX by XOR-ing the original incident Wi-Fi data (via the cloud) and the received backscattered alteration.

Preferred embodiments of the invention will now be discussed with respect to experiments and drawings. Broader aspects of the invention will be understood by artisans in view of the general knowledge in the art and the description of the experiments that follows.

FIG. 1A shows a preferred transmission-line-less programmable SSB QPSK backscatter modulator 100 that uses heterodyne transmitter approach. Quadrature IF clocks $IF_0$ and $IF_{90}$ are generated from a crystal-stabilized (and thus PVT-robust) PLL 102 with MUX 103 that are part of SSB mixers $104_1$ and $104_Q$. Quadrature I/Q data $101_1$ and $101_Q$ (stored on or provided by a sensor on a tag including the modulator 100) is first up-converted to quadrature IF signals via the two IF SSB mixers $104_1$ and $104_Q$, and the quadrature IF signals $IF_{OUT,I}$ and $IF_{OUT,Q}$ with their complements generated by inverters $106_1$ and $106_Q$ then drive two sets of differential backscatter switch pairs $108_1$ and $108_Q$, respectively. To generate the required quadrature RF signals that mix with the quadrature IF signals for SSB modulation, two distinct loads $110_{L,0}$ and $110_{L,90}$ that provide π/2 phase difference in reflection coefficients (i.e., $Z_{L,0}$ and $Z_{L,90}$) are connected to each set of the backscatter switch pairs $108_1$ and $108_Q$, respectively. By summing up the two backscattered signals via a power combiner 112 that drives an antenna 114, SSB backscattering is achieved.

In an example implementation demonstrated experimentally, $Z_{L,0}$ is an open circuit which has $\Gamma_{L,0}=e^{j \times 0°}$, while $Z_{L,90}=-j \times 50$ and is realized by a 1.3 pF capacitor including parasitics at the operating 2.4 GHz band, which has $\Gamma_{L,0}=e^{j \times -90°}$, respectively. Moreover, for the two 50Ω paths, the 50Ω termination is realized directly by the on-resistance of the transistor connected to ground in the backscatter switch pairs $108_1$ and $108_Q$. The on-resistance of the switch that connects to the capacitor is ~2.5Ω.

the use of a capacitor to realize the π/2 phase shift makes capacitor variation and therefore phase variation of concern. This phase variation causes the same issue as conventional image-rejection transceivers, where the RF LO I/Q mismatch results in sideband leakage and therefore lower IRR. Since capacitor variation will only change the phase of $\Gamma_{L,90}$ rather than the magnitude, the IRR is ideally dominated by the phase variation only and can be simplified as:

$$IRR \approx \frac{4}{\Delta\Theta^2} \quad (1)$$

where Δθ is phase difference and can be derived as:

$$\Delta\Theta = \angle\Gamma_{L,90} - \left(-\frac{\pi}{2}\right) = \angle\left(\frac{Z_{L,90} - Z_0}{Z_{L,90} + Z_0}\right) + \frac{\pi}{2} \quad (2)$$

$$= \angle\left(\frac{\frac{1}{j\omega C_L} - Z_0}{\frac{1}{j\omega C_L} + Z_0}\right) + \frac{\pi}{2}$$

$$2\tan^{-1}\left(\frac{1}{\omega C_L Z_0}\right) - \frac{\pi}{2}$$

and $Z_0$ is the transmission-line characteristic impedance, $C_L$ is the capacitor for phase shifting, and w is the angular frequency, respectively. Assuming a target IRR of 20 dB, which is typical for a first-order image rejection mixer realized by a passive RCC R network, the following equation can be derived to find the tolerable range of CL by plugging (2) into (1):

$$\tan^{-1}\left(\frac{1}{\omega C_L Z_0}\right) = \frac{\pi}{4} \pm 0.1 \quad (3)$$

Assuming an ideal 50Ω $Z_0$ and a 2.44-GHz operating frequency, $C_L$ can vary between 1.1 and 1.6 pF, which is reasonable for a typical implementation even under severe variation. Instead of a fixed capacitor, a switched capacitor can be used to provide more precise phase differences as the channel frequency is programed, which is another benefit provided by the present N-chip SSB technique compared to conventional OFF-chip transmission-line approaches. Moreover, by selecting the proper sign to an adder 104$_{+/-}$ in the IF SSB mixers 104$_1$ and 104$_Q$, either USB or LSB backscattering can be achieved.

Figure 1B:
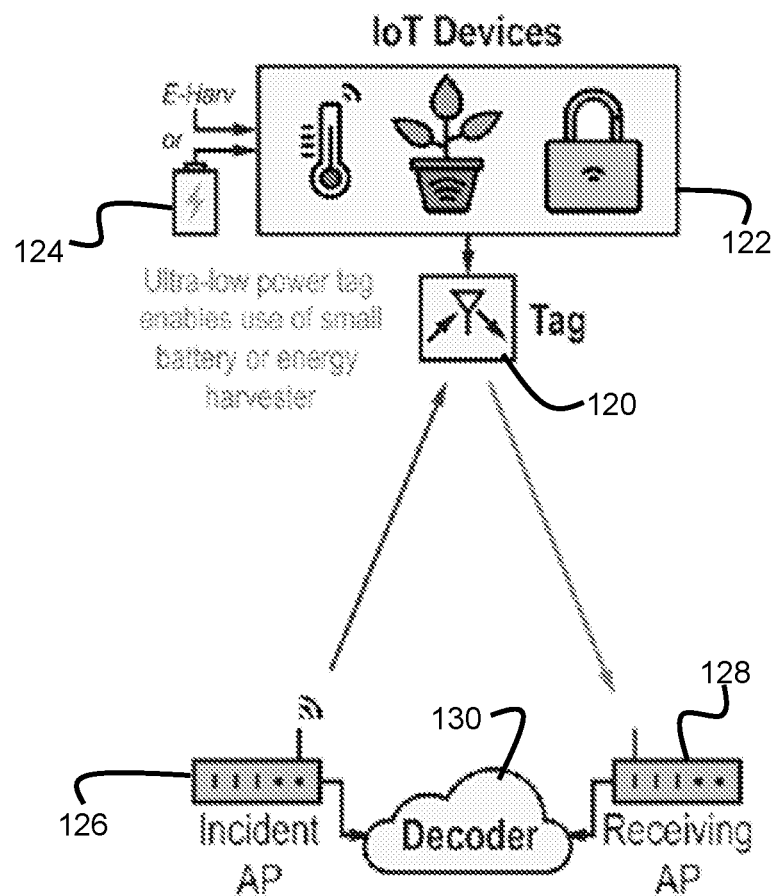
FIG. 1B shows a preferred system including an ultra-low power tag device that can use the modulator of FIG. 1A.

FIG. 1B shows a preferred system including an ultra-low power tag 120 that can use the modulator 100. The tag 120 can be associated with a IoT device 122 and powered by an ultra-low power batter 124 via an energy harvesting device, e.g. a solar cell. An incident AP 126 sends a wake-up signal, the tag 120 responds via Wi-Fi compliant backscatter that is received by a receiving AP 128. A decoder 130 can be provided via the cloud. The system of FIG. 1B is capable of 1) synchronizing to architected incident Wi-Fi-compliant packets via an integrated 2.8 μW energy-detecting wake-up receiver (WuRX); 2) modulating the phase of incident Wi-Fi signals and frequency-translating them to another Wi-Fi channel via a crystal-stabilized multi-phase LO, to enable clear and robust reception of protocol-compliant data; 3) utilizing an IQ mixer driving multi-phase-terminated backscatter switches to enable SSB QPSK modulation to a another Wi-Fi channel; and 4) receiving and decoding the tag data with a commercial Wi-Fi TRX by XOR-ing the original incident Wi-Fi data (via the cloud) and the received backscattered alteration.

Figure 2:
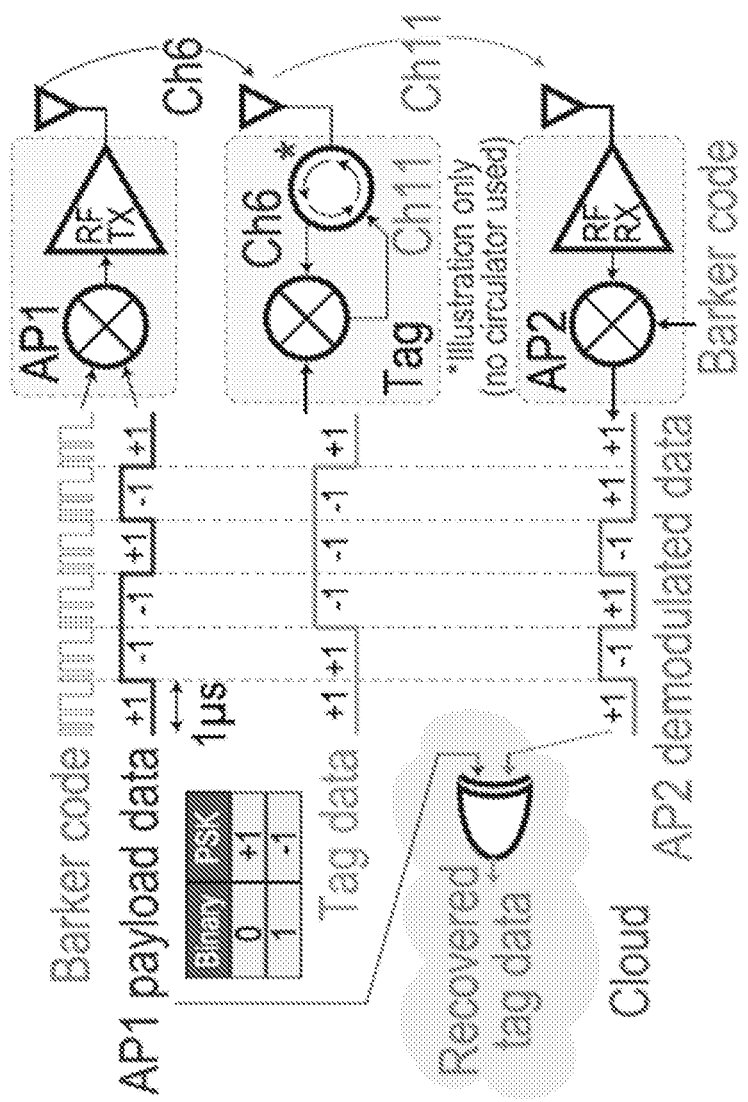
FIG. 2 illustrates a BPSK-based example of a code-word translation technique from Hitchhike [3]

A preferred approach for Wi-Fi compatible backscatter communications is a modification of the Hitchhike technique in [3]. FIG. 2 illustrates a BPSK-based example of a code-word translation technique that is a modification of Hitchhike. With regard to FIG. 2, for an 802.11b Wi-Fi signal, a 1 Mbps payload data is first correlated with an 11-bit Barker code sequence for DSSS. When the payload symbol is 0, the Barker sequence is unchanged, while a payload symbol of 1 makes the phase of Barker sequence inverse. This modulated signal is then up converted to RF, transmitted out by AP1, and incident to the tag. The wake-up receiver in Hitch Hike required a third device (e.g., a smartphone) to wake-up and activate backscatter between two APs. The present invention provides a wake-up receiver, as in FIG. 1A, that is sufficiently sensitive so it does not require third device to wake up and only two APs are required for wake-up.

At the tag side, a similar modulation method is used to modulate the tag data onto the incident signal. When the tag symbol is 0, the Wi-Fi data are unchanged, while a tag symbol of 1 makes the phase of Wi-Fi data inverse. This tag-data-modulated Wi-Fi signal is then backscattered to an alternate Wi-Fi channel for reception by AP2, noting that frequency-translation eliminates the self-jammer issue.

At AP2, the received backscattered signal is down-converted and correlated with the same 11-bit Barker code sequence used in AP1, and demodulated data is obtained-though this data is a mix between the originally transmitted packet by AP1 and the tag's data. Finally, by doing a simple XOR between the AP1 payload data and the AP2 demodulated data, the tag data can be recovered in the cloud. To make this technique work, the backscattering tag should have a wake-up receiver that is sufficiently sensitive to enable a link budget when the two Wi-Fi APs are placed 10-20 m apart, as is typically done in home- or office-based mesh networks. In the prior approach, power consumption is impacted because the downlink wake-up receiver needs to be always on such that the tag can respond immediately to packet requests, it can become the power bottleneck of the entire tag IC.

The preferred approach consistent with FIG. 1B improves upon the prior Hitch Hike without needing the third AP and achieves lower power consumption, better sensitivity, and full standards compatibility. Regarding sensitivity, the present approach provides a downlink wake-up receiver with sensitivity sufficient for the target real-world applications. For target IoT applications using 2.4-GHz Wi-Fi channels, a −40-dBm sensitivity is sufficient to achieve a >30 m range based on RSSI over TX-to-tag distance measurements in a typical office environment, for example. The preferred approach is also able to efficiently recognize and wake up in response to a Wi-Fi packet. Before the transmitting Wi-Fi AP provides the incident signal for uplink backscattering, it is first reused to send an indication packet for the downlink wake-up receiver to tell the tag to begin backscattering at the appropriate time. Therefore, the downlink wake-up receiver also needs to be able to demodulate the indication Wi-Fi packet and distinguish this packet from other standards. Advantageously, the preferred approach uses a Wi-Fi-compatible wake-up receiver that leverages the idea of backchannel communication, where signals are generated by a standard-compliant transmitter, yet encodes information in an auxiliary low-complexity and low data rate modality.

Figure 3A:
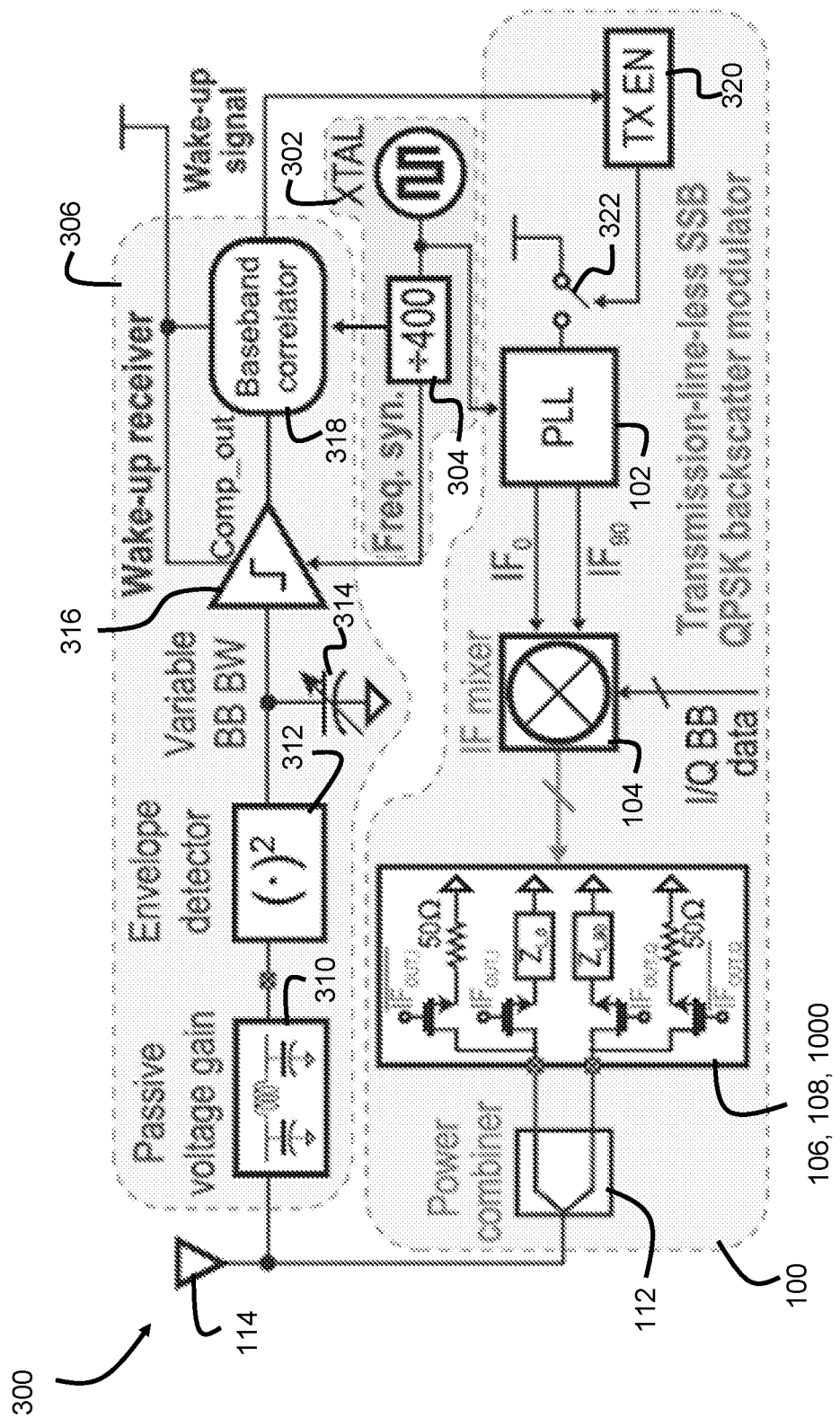
FIG. 3A shows a preferred backscatter integrated tag device of the invention.
Figure 3B:
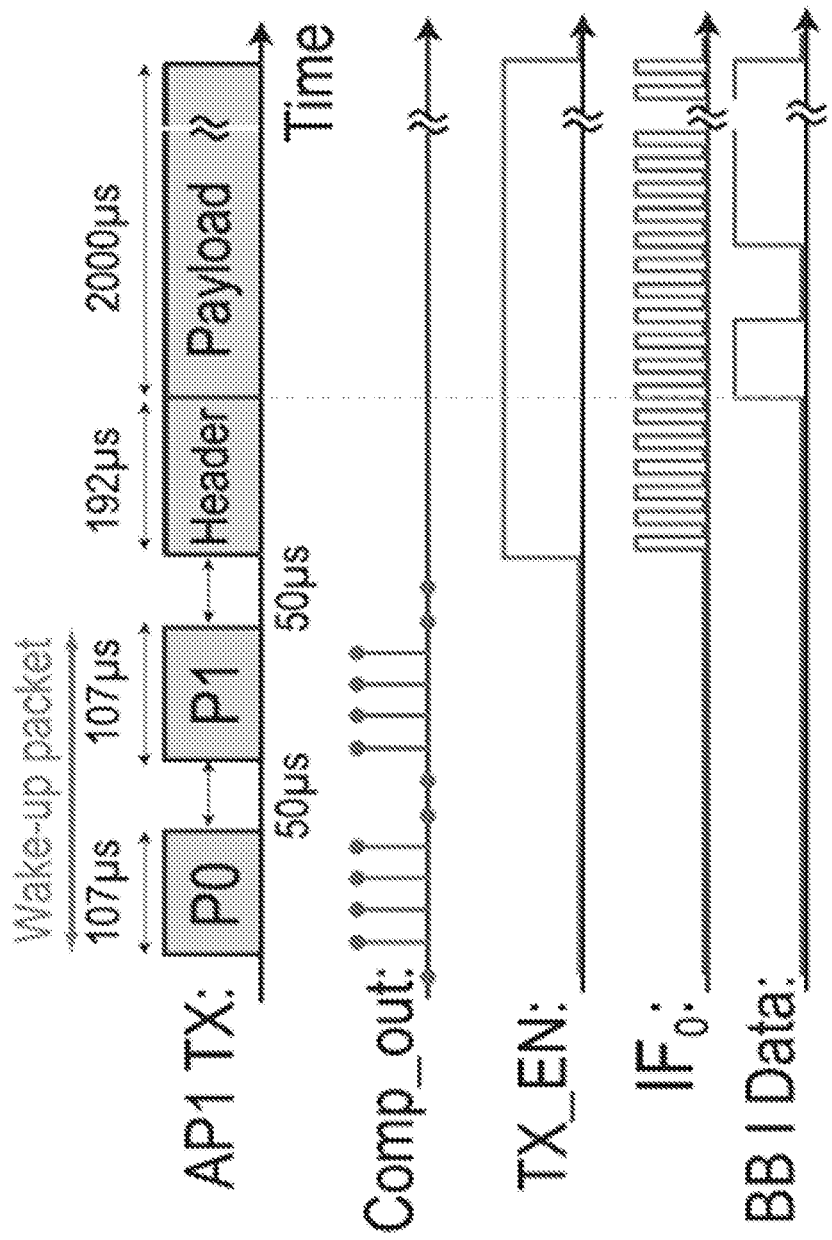
FIG. 3B is a preferred timing diagram for wake-up and backscatter communications and packet structure, which is standards-compliant with Wi-Fi.

FIG. 3A shows a preferred backscatter integrated tag device 300 of the invention. FIG. 3B shows a preferred timing for wake-up and backscatter communications. The wake-up packet in FIG. 3B includes two packets P0 and P1, which are packets that don't contain any useful data for the system. The tag device 300 measures the length of time these packets occupy, and the time between them, to decide whether to wake-up the backscatter modulator. The actual packet that is received upon wake-up contains a header that complies with Wi-Fi standards. Backscatter modulation begins at the payload. The tag device includes the modulator 100 of FIG. 1. A crystal oscillator 302 with a frequency divider 304 provides a global frequency reference. A downlink Wi-Fi compatible wake-up receiver 306 completes the preferred tag 300. In a preferred embodiment, the tag consists of the modulator 100, the oscillator 302 and the wake-up receiver 306.

The download wake-up receiver 306 includes an energy-detection based architecture is adopted for low standby power, and therefore requires a wake-up packet designed to be Wi-Fi compatible and able to encode information that can be demodulated in an OOK fashion. As seen in FIG. 3B, a transmitting Wi-Fi AP first initiates a 107-μs broadcast packet, and after a DIFS time of 50 μs, the AP sends another broadcast packet of the same 107 μs length, shown as packets P0 and P1. These packets are built to comply with existing 802.11b protocols, and the energy valley provided by the DIFS time makes it suitable for OOK demodulation.

In FIG. 3A, the wake-up signal is received by antenna 114 then first amplified and filtered by a front-end matching network 310 that, in a preferred embodiment, provides 8 dB of passive voltage gain, which directly improves the sensitivity of an energy-detection based RX. An ED 312 then directly demodulates the RF wake-up signal to baseband via its $2^{nd}$ order nonlinearity while a programmable capacitor 314 is used at the output of ED 312 to set the bandwidth for baseband signal filtering. The ED output is then over-sampled and digitized by a two-stage dynamic comparator 316 with a threshold, which is preferably programmable to reduce offset voltage issues and optimize sensitivity. One way to realize a programmable threshold is to send packets in an initialization, change the threshold, and then determine which value of threshold works best. In other approaches, the threshold can be set according to data based upon the environment in which the tag will operate. The comparator output is then processed by an integer-bit (in the example an 11-bit) digital correlator 318 with soft-decision decoding (preferably used to avoid the need for a perfect match and instead using a softer threshold for wake-up) to enable robust detection of the pre-specified Wi-Fi signature of FIG. 3B. Once the value exceeds a pre-defined threshold, a wake-up signal is generated.

After the wake-up event, the baseband correlator 318 counts for a predetermined amount of time to avoid downlink interference until the uplink backscatter modulator is enabled via transmission enable logic 320 and a switch 322 to activate the PLL 102. Before any tag data modulation starts, the 192-μs packet header is first backscattered (with frequency translation) to the receiving AP2, though without any phase alteration to ensure correct reception by AP2. After the header, the payload I/Q data (that is stored on or comes from a sensor on the tag 300) is modulated by the tag data and then backscattered to AP2. Finally, AP1 and AP2 recover the tag data in cloud. FIG. 3B shows the complete work flow timing. Artisans will appreciate that BPSK or another modulator could be used instead of the QPSK modulator of FIG. 1. The TX enable 320 and a set of backscatter switches can be incorporated with such other modulators and a mixer to mix the tag data.

Figure 4:
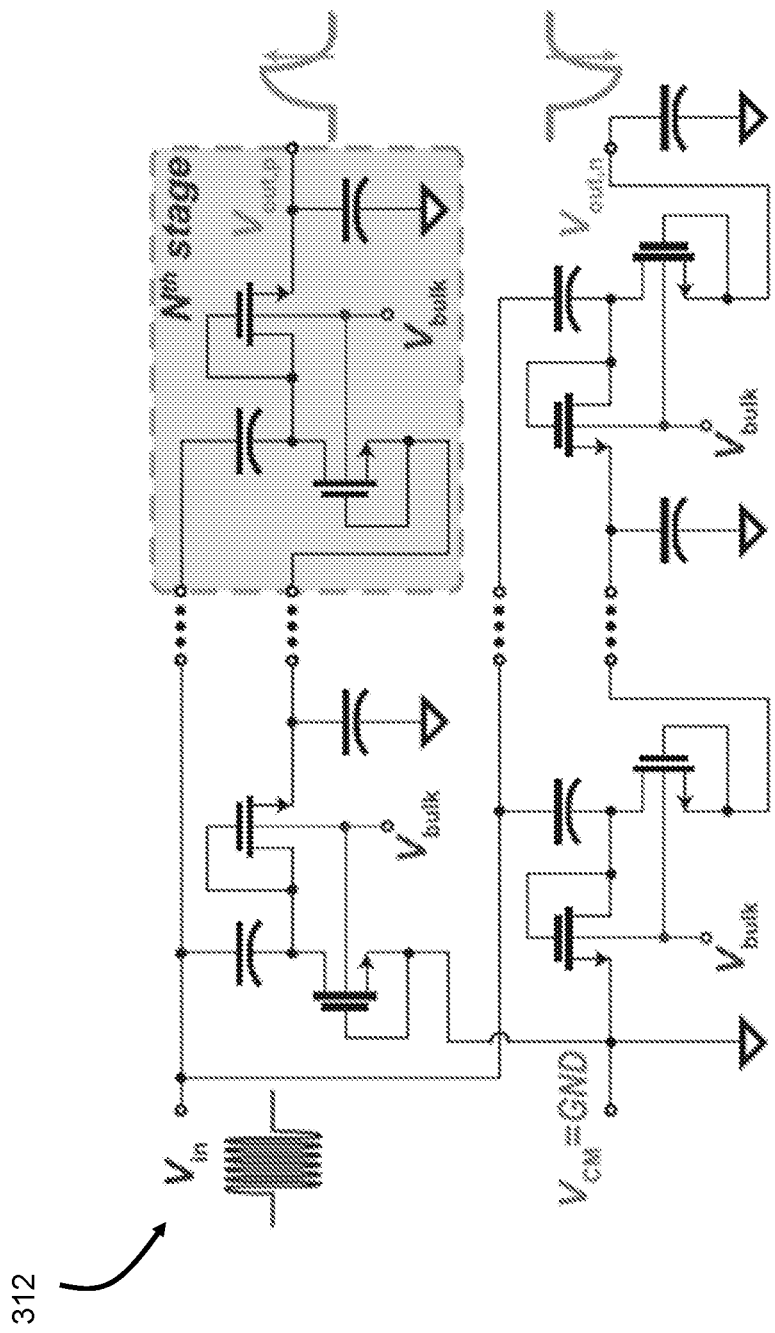
FIG. 4 (Prior Art) is a schematic diagram of the passive pseudo-balun envelope detector preferred for the integrated tag device of FIG. 3A.

FIG. 4 is a schematic diagram of a passive pseudo-balun envelope detector 312 that is preferred for the present tag. The ED 312 of FIG. 4 is from P.-H.-P. Wang et al., "A 6.1-nW wake-up receiver achieving-80.5-dBm sensitivity via a passive pseudo-balun envelope detector," IEEE Solid-State Circuits Lett., vol. 1, no. 5, pp. 134-137, May 2018. Since the sensitivity of conventional energy-detection based wake-up receivers tend to be limited by the performance of the ED, a high-performance ED is provided as a preferred passive pseudo-balun envelope detector 312. To support the passive voltage gain, the ED 312 must provide a large enough input resistance to not degrade the passive voltage gain of the front-end matching network 310, while also providing sufficient output bandwidth for the baseband signal, e.g., 200 kHz for sharp rising and falling time of the baseband signal. The bandwidth should be high enough to ensure a sharp rise and fall time of the baseband signal. 200 kHz was a nice compromise between these competing constraints, while other numbers can be used. While active EDs can offer high input resistance with wide bandwidths, active EDs have higher 1/f noise and power consumption. Passive EDs do not have any 1/f noise concerns and therefore permit smaller devices with lower input capacitance, which enables larger passive voltage gain. Most importantly for use in tag, passive EDs consume zero power.

The ED 312 has a pseudo-balun architecture. The passive ED 312 demodulates a single-ended input RF signal to a pseudo-differential output signal, which enables a 2× conversion gain compared to a single branch, which therefore provides 6 dB more noise rejection for the post-ED stage. Moreover, this architecture inherently provides 1.5 dB of sensitivity improvement under the same output bandwidth compared to its single-ended counterpart. To over-come Vt variation, all NMOS transistors are implemented in a deep N-well, and the bulk node is connected to a 4-bit diode ladder voltage reference that provides a tunable VBS to set the output bandwidth. Based on simulation, a 100 mV increase in VBS corresponds to a ~1.46× increase in bandwidth in this design, and 500 mV of VBS corresponds to the desired 200 kHz of output bandwidth. Following the design procedure provided in .-H.-P. Wang et al., "A 6.1-nW wake-up receiver achieving-80.5-dBm sensitivity via a passive pseudo-balun envelope detector," IEEE Solid-State Circuits Lett., vol. 1, no. 5, pp. 134-137, May 2018, the ED stage number N is chosen to be 4 in this design to achieve the highest ED output SNR under a pre-defined bandwidth.

Figure 5:
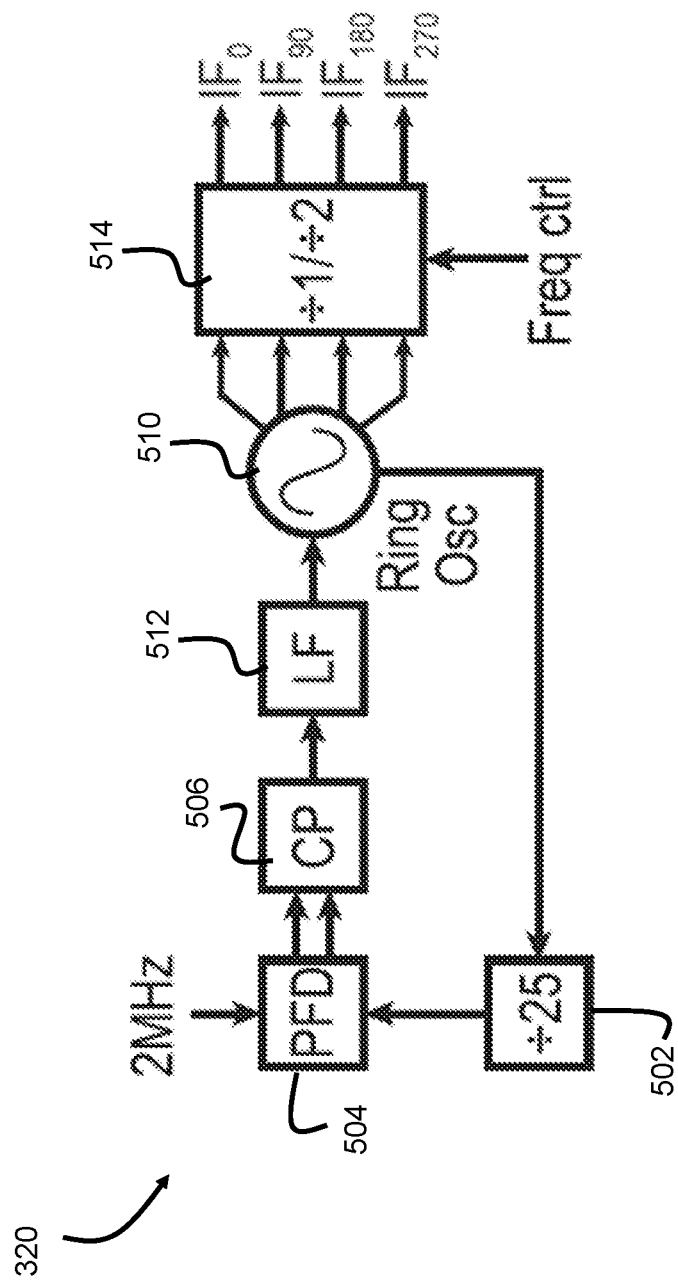
FIG. 5 illustrates a preferred PLL of the integrated tag device of FIG. 3A.

FIG. 5 illustrates the preferred PLL 320 for the tag 300. To use the 2.4-GHz ISM band, the center frequencies of Wi-Fi channels 1, 6, and 11 are located at 2412, 2437, and 2462 MHz, respectively. To backscatter to an another channel, e.g., an adjacent channel, a 25-MHz IF clock is then required, while a 50-MHz IF clock is desired to enable translation between channels 1 and 11. Therefore, a locking frequency of 50 MHz is chosen for the PLL 322. With a 2-MHz frequency reference divided from the XTAL clock 302, a standard type-II integer-N PLL is adopted with a divider 502 having a ratio of 25 fed back into a phase/frequency detector (PFD) 504 that provides phase error output that controls a charge pump (CP) 506, an output of which adjusts a ring oscillator 510 to correct phase error via a loop filter 512. To provide the required quadrature IF clock for SSB backscattering, the VCO is implemented via the ring oscillator 510 that provides the 4 clock phases. These four phases of clocks are passed through frequency control divider logic 514 to alternate the frequency between 25 or 50 MHz depending on the operating channels.

Figure 6:
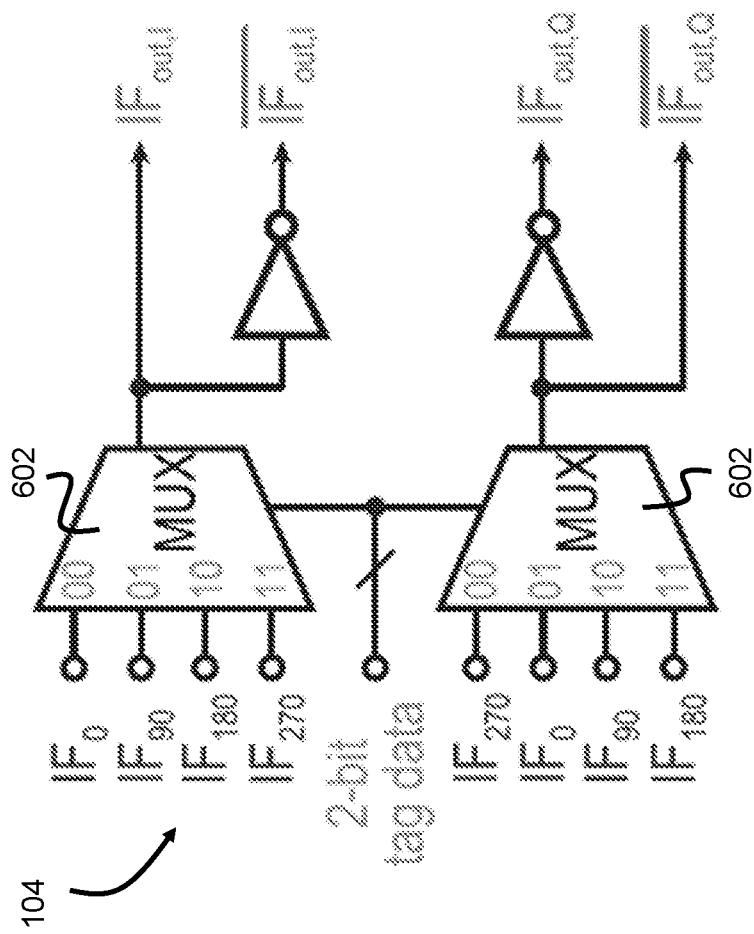
FIG. 6 shows the preferred IF Mixer of the integrated tag device of FIG. 3A.

FIG. 6 shows a preferred MUX 103 to generate the clock signals in FIG. 1A with the PLL 102. The digital implementation includes Two 4:1 MUX logic units 602 with 90° rotated IF clock input, and by controlling the MUXs via a 2-bit tag data, QPSK modulation can be achieved.

Experimental Data

Figure 7:
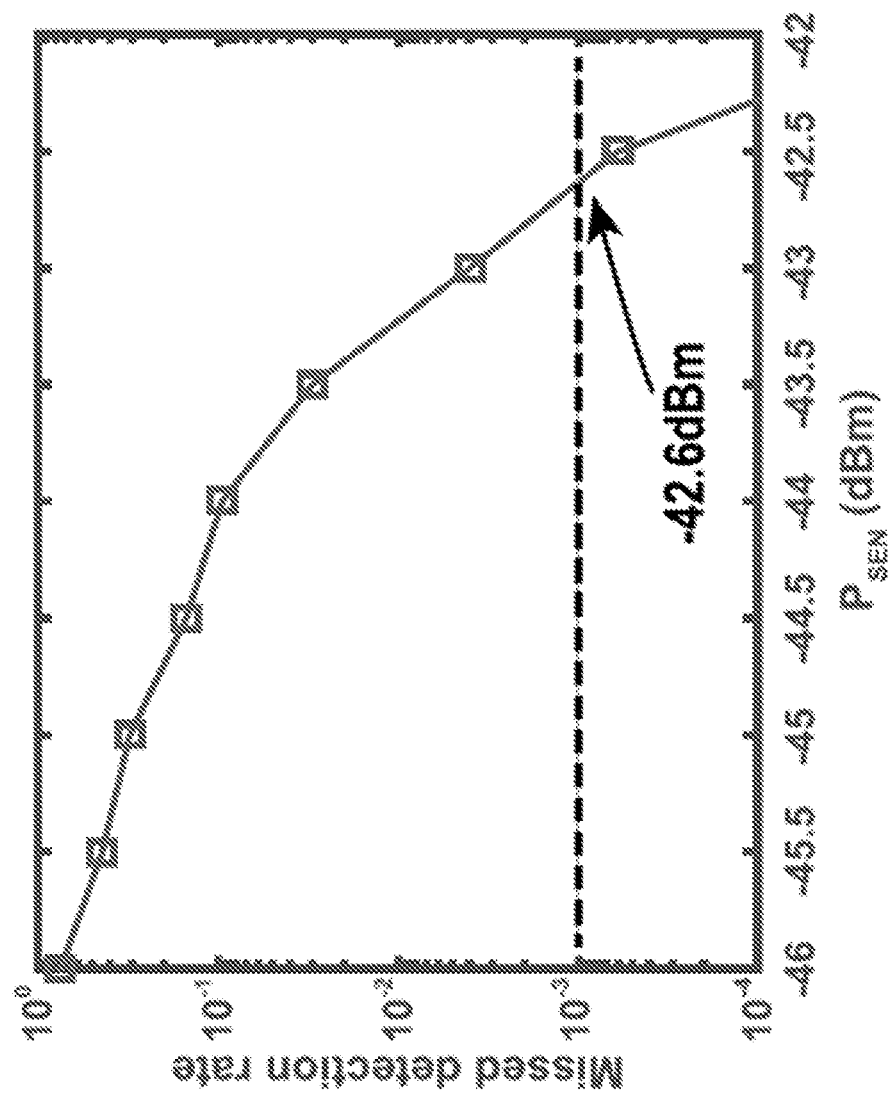
FIG. 7 is a sensitivity waterfall curve of the downlink of an experimental integrated tag device consistent with FIG. 3A.

The backscatter tag IC as fabricated in a 65-nm CMOS process, occupying a core area of 0.34 mm². Although there are many possible ways to perform power combining, in this example, an on-board Wilkinson power combiner was implemented. The sensitivity waterfall curve of the downlink WuRX is shown in FIG. 7, revealing a sensitivity of −42.6 dBm for a missed detection rate (MDR) of 10-3 with less than a 1/h false alarm rate. This sensitivity is sufficient to support an AP-to-tag wake-up distances of >30 m.

Figure 8B:
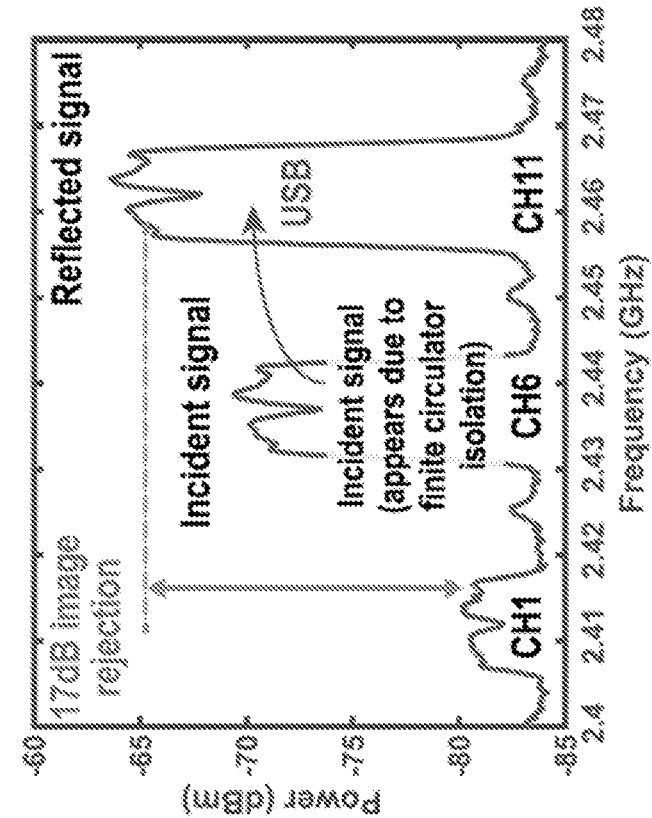
FIGS. 8A and 8B illustrate image rejection for respective lower sideband modulation and upper sideband modulation of an experimental integrated tag device consistent with FIG. 3A.
Figure 8A:
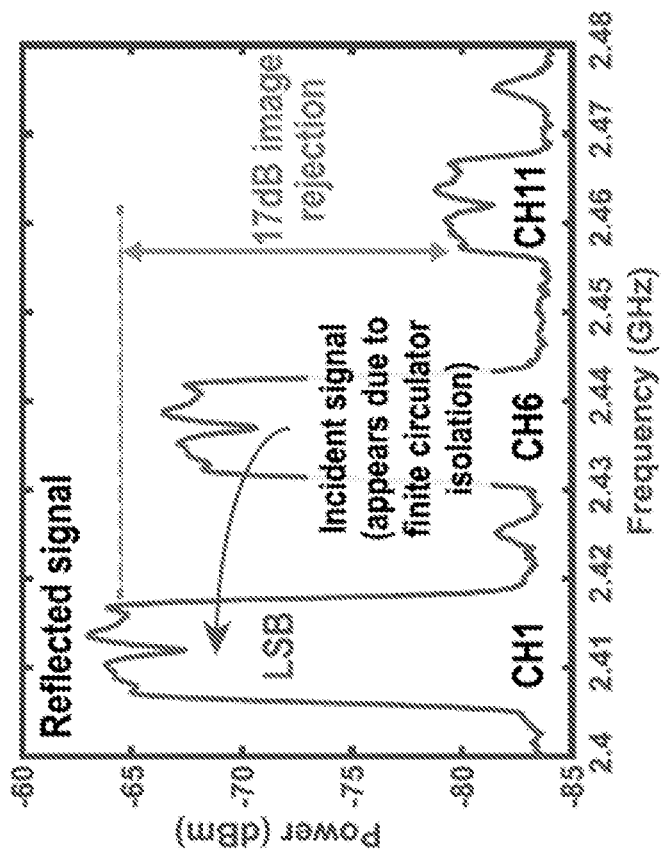

Wired benchtop tests with a 17-dB-isolation circulator, used for characterization purposes only, show that an incident-40-dBm 802.11b Wi-Fi signal at channel 6 (−57 dBm power shown on the spectrum analyzer due to finite circulator isolation), can be reflected to either channel 1 or 11 at −55 dBm with 17 dB of image rejection in the opposite channel, as seen in FIG. 8A for lower sideband modulation and FIG. 8B for upper sideband modulation.

Figure 9:
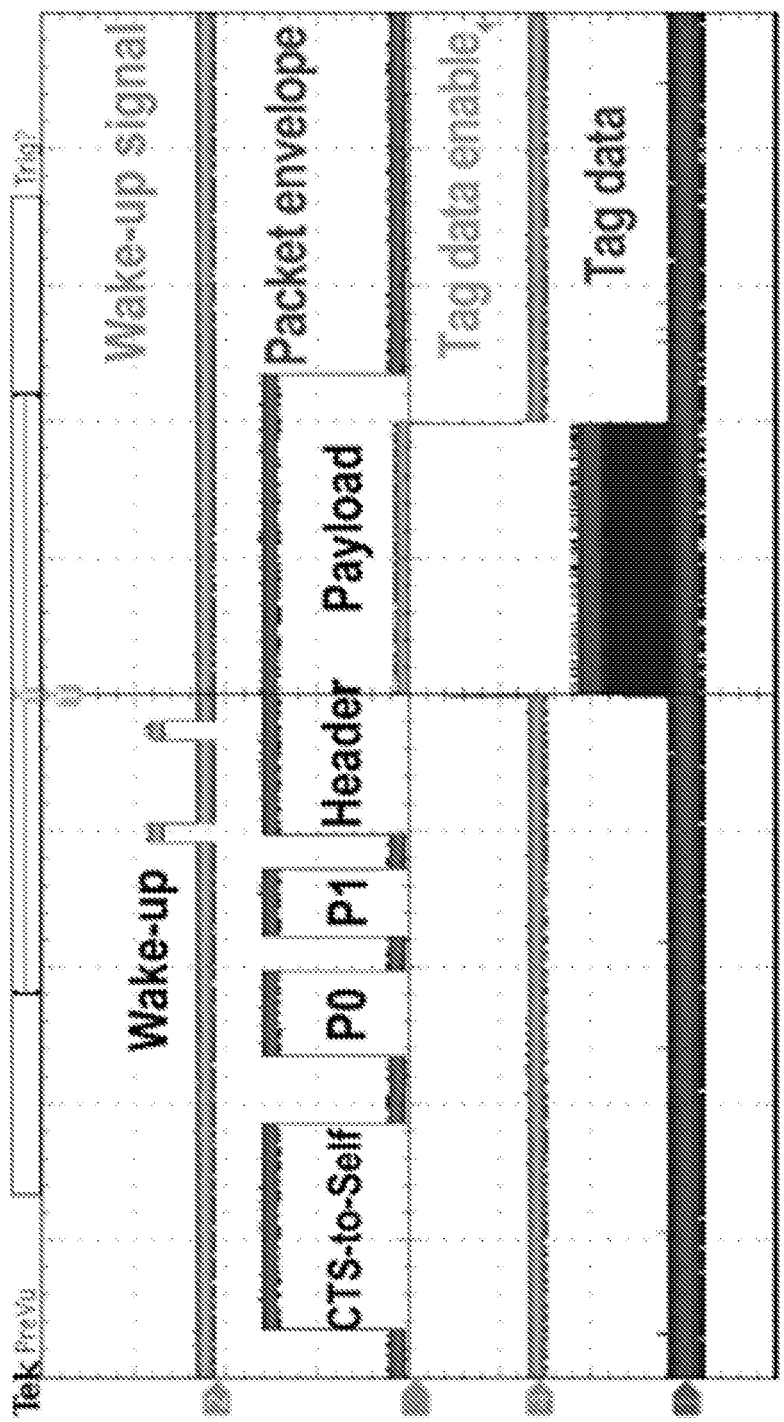
FIG. 9 are transient waveforms showing that the experimental integrated tag correctly wakes up upon reception of the FIG. 3B packet.

Transient waveforms in FIG. 9 shows that the tag correctly wakes up upon reception of the FIG. 3B packet, which is standards-compliant with Wi-Fi. The tag data then waits for the header to be backscattered first, and then is enabled to modulate the payload. During wake-up mode, the chip consumes 2.8 μW: 1.5 μW from the crystal oscillator, and 1.3 μW from the baseband and correlator. During active mode, the backscatter circuits consume 28 μW, where the charge-pump consumes 10 μW, and the digital portion of the circuits (i.e., ring oscillator, divider, phase-frequency detector (PFD), and SSB IF mixer) consume the remaining 18 μW. The PLL phase noise at 1 MHz frequency offset is −114 dBc/Hz based on simulation. Moreover, the PLL settling time is ~5.5 μs, which is well within the 50 μs window between the end of the wake-up packet and the start of the header packet.

In over-the-air experiments, a Wi-Fi AP1 transmits packets to the tag, which backscatters them to a different channel for reception by a TPLINK Archer C7 access point AP2. For this prototype, the chip is assembled via chip-on-board, and a commercial off-the-shelf 2.4 GHz whip antenna with 3 dBi peak gain is used. For the transmitting and receiving access points, 2.4-GHz antennas with 8 dBi gain are employed on the commercial off-the-shelf hardware—these are standard antennas used in Wi-Fi routers and access points. Wireless test shows that the tag can successfully communicate at any distance between Aps that are located 21 m away from each other, or to a 91 m away AP if the tag is within 1 m of any other Wi-Fi node. Being the first completely IC-based implementation of Wi-Fi backscatter, the prototype demonstrated lower power consumption and greater range than conventional approaches and required no tone generator. Greater than 30 m downlink wake-up range with −42.5 dBm were demonstrated and data rate of 2 Mbps and an operating frequency of 2.4 GHz. Power consumption was 2.8 μW during stand-by and 28 μW during backscatter.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An on-chip integrated wake-up receiver tag device, comprising:
   a downlink Wi-Fi compatible wake-up receiver that checks timing of Wi-Fi compatible signals for a wake-up packet;
   a modulator that is turned on in response to the wake-up packet;
   a mixer in the modulator that mixes tag data with a payload packet from received Wi-Fi payload; and
   backscatter switches in the modulator to receive output from the mixer and provide a backscatter transmission signal, wherein the wake-up receiver comprises:
   a front-end matching network that provides passive gain to a received signal;
   a passive demodulator that demodulates the received signal;
   a filter for bandwidth filtering of the received signal;
   an analog to digital converter for converting the received signal; and
   a digital correlator with soft-decision decoding to check the received signal for pre-specified Wi-Fi wake up packet via a threshold comparison and once the threshold is exceeded generate a wake-up signal to enable the modulator.

2. The device of claim 1, wherein the passive demodulator comprises a passive pseudo-balun envelope detector.

3. The device of claim 2, wherein the filter comprises a programmable capacitor.

4. The device of claim 3, wherein the analog to digital converter comprises an oversampling comparator.

5. The device of claim 1, wherein the backscatter switches comprise QPSK backscatter switches in the modulator to provide single-sideband QPSK modulation of data from the mixer.

6. An on-chip integrated wake-up receiver tag device, comprising:
   a downlink Wi-Fi compatible wake-up receiver that checks timing of Wi-Fi compatible signals for a wake-up packet;
   a modulator that is turned on in response to the wake-up packet;
   a mixer in the modulator that mixes tag data with a payload packet from received Wi-Fi payload; and
   backscatter switches in the modulator to receive output from the mixer and provide a backscatter transmission signal, wherein the modulator comprises:
   an enable switch to enable a frequency generator, the frequency generator being configured to generate quadrature I/Q clocks;
   an IF mixer receiving the quadrature I/Q clocks and Quadrature I/Q data;
   differential backscatter switches receiving the IF mixer output, the switches including two separate loads that provide $\pi/2$ phase difference in reflection coefficients; and
   a power combiner that sums backscatter signals from the backscatter switches.

7. The device of claim 6, wherein said wake-up receiver checks for a wake-up packet in an incident Wi-Fi-compliant wake-up signal via timing measurements; and upon detection of the wake-up packet via timing measurements, wakes up the modulator.

8. The device of claim 6, wherein the IF mixer selects between an upper sideband and a lower side band.

9. The device of claim 6, wherein the two separate loads comprise an open circuit and a fixed resistance.

* * * * *